May 22, 1962      W. KINDER      3,035,482
INTERFEROMETERS

Filed Dec. 4, 1959      4 Sheets-Sheet 1

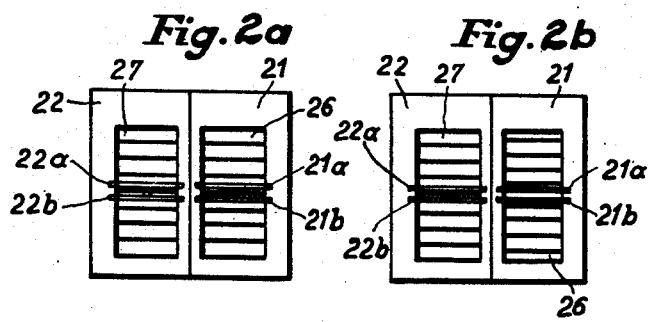
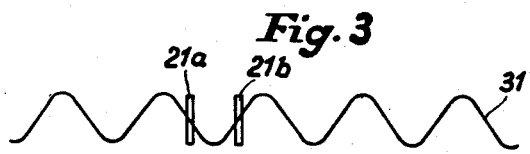
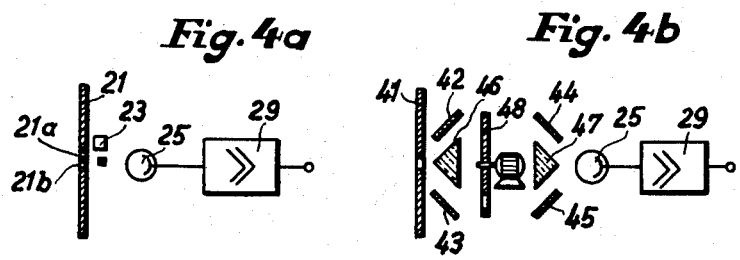
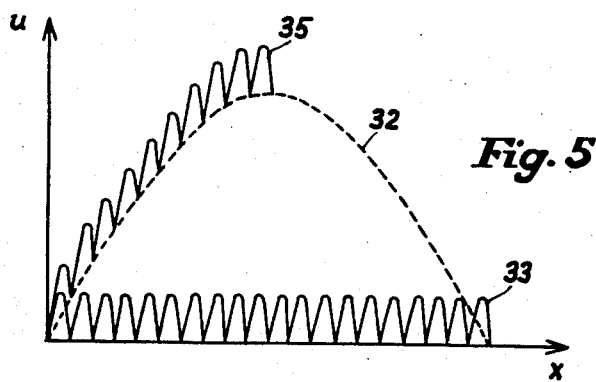

United States Patent Office 3,035,482
Patented May 22, 1962

3,035,482
INTERFEROMETERS
Walter Kinder, Heidenheim, Germany, assignor to
Carl Zeiss, Heidenheim (Brenz), Germany
Filed Dec. 4, 1959, Ser. No. 857,438
Claims priority, application Germany Dec. 6, 1958
10 Claims. (Cl. 88—14)

The invention relates to interferometers and particularly to improvements in such interferometers which are employed for that type of measuring purposes in which the displacement of the interference fringes is used for determining the change in the value of a measurement, for instance, for determining the concentration of a gas. In interferometers of this type the interference fringes are displaced by a compensator until they return again to the zero position, whereby the size of the displacement constitutes the measuring value. In the interferometer of the invention this displacement of the interference fringes is compensated by photo electrically operated elements and the value of the measurement determined by the compensation is directly recorded. Interferometers are known in which for the purpose of obtaining the value of a measurement the displacement of the interference fringes is compensated by optical elements which are operated by photo electrical means and in which the change of a measuring value is directly observed or recorded respectively. As long as the change in the measuring value remains so small that the displacement of the interference fringes is smaller than one half of the distance between the fringes, the mentioned known interferometers operate without any errors. If, however, the measuring value becomes greater and if, for instance, the displacement of the interference fringes amounts to a plurality of width of these fringes, then errors may occur, particularly, when at a certain change of the measuring value the device is thrown out of synchronism and one employs a wrong fringe when making the adjustment. This error may also occur when the interference fringes are produced with white light so that colored fringes are being produced.

It is one of the objects of the present invention to produce an interferometer which during its operation eliminates the aforementioned disadvantage and which permits a correct measurement not only of a small displacement, but also of a larger one or a sudden change of the value to be measured. In accordance with the invention this object is obtained by providing in addition to the customary pair of measuring chambers at least one pair of auxiliary measuring chambers, whereby during the measurement in the prevailing interference fringe system a smaller displacement of the fringes is produced as in the pair of measuring chambers, and that the mentioned auxiliary chambers are provided with optical compensating elements which are coupled with compensating elements which are operated by photoelectric means and are associated with the pair of measuring chambers. It is of advantage when the pair of auxiliary chambers is so constructed that in the associated interference fringe system a displacement of the interference fringes is produced which amounts always to less than one half of the width of the fringes.

When the interference fringe system produced by the pair of auxiliary chambers is displaced preferably less than one half of the width of the interference fringe during the measurement, then one obtains the results that the device for the adjustment associated with the pair of auxiliary chambers will always employ the correct fringe. The coupling of the compensating elements associated with the pair of measuring chambers and with the pair of auxiliary chambers has the result that when the compensation takes place in the auxiliary branch at the same time a coarse adjustment of the fringes in the measuring branch takes place. If one now by a suitable construction of the adjusting device takes care that after the completion of the compensation in the auxiliary branch the remaining displacement in the measuring branch is smaller than one half of the fringe, then the adjusting device associated with the pair of measuring chambers will also use always the correct fringe for the adjustment.

For the purpose of obtaining this object it is only necessary to make the adjusting devices sufficiently sensitive and to produce such a coupling of the compensator elements associated with the individual pairs of chambers that these compensator elements are operated in accordance with the ratio of the fringe displacement.

In accordance with the invention it is advisable to make the auxiliary chambers shorter than the measuring chambers and to establish a direct communication between the associated chambers. When this is done, the fringe displacement in the interference fringe system produced by the pair of auxiliary chambers will automatically be only a fraction of the fringe displacement of the interference fringe system produced by the pair of measuring chambers.

The same result may also be obtained when the auxiliary chambers are made of the same length as the measuring chambers and when one provides devices which are known per se which in the auxiliary chambers maintain a smaller concentration of the substance to be measured than in the measuring chambers.

If the measuring range of the interferometer is to be very great, then it is of advantage to employ a plurality of pairs of auxiliary chambers which between themselves produce different displacements of the fringes. In such a case the coarse adjustment takes place in different steps and in such a manner that the displacement of the fringes in an interference fringe system of a predetermined pair of chambers will be compensated by the preceding coarse displacement up to at least one half of the width of the fringe.

Still another object of the invention is to provide the interferometer of the present invention with a pair of auxiliary chambers of variable length in order that the interferometer may be used for different measuring conditions.

With these and other objects in view, which will be described hereafter, the invention will now be described in connection with a number of examples which are illustrated in the accompanying drawings, in which FIG. 1 illustrates diagrammatically an interferometer constructed in accordance with the present invention;

FIG. 2a illustrates the interference fringe systems in the zero position and produced by the interferometer according to FIG. 1;

FIG. 2b illustrates the interference fringe system produced by the interferometer of FIG. 1 when the measuring value changes;

FIG. 3 illustrates the brightness distribution in the interference image and also the arrangement of the two slits belonging to the photoelectric adjusting device;

FIG. 4a illustrates by way of example an embodiment of the photoelectric adjusting device;

FIG. 4b illustrates another embodiment of the photoelectric adjusting device;

FIG. 5 illustrates the control voltage which is fed to the electric motor of the adjusting device;

Figure 1:
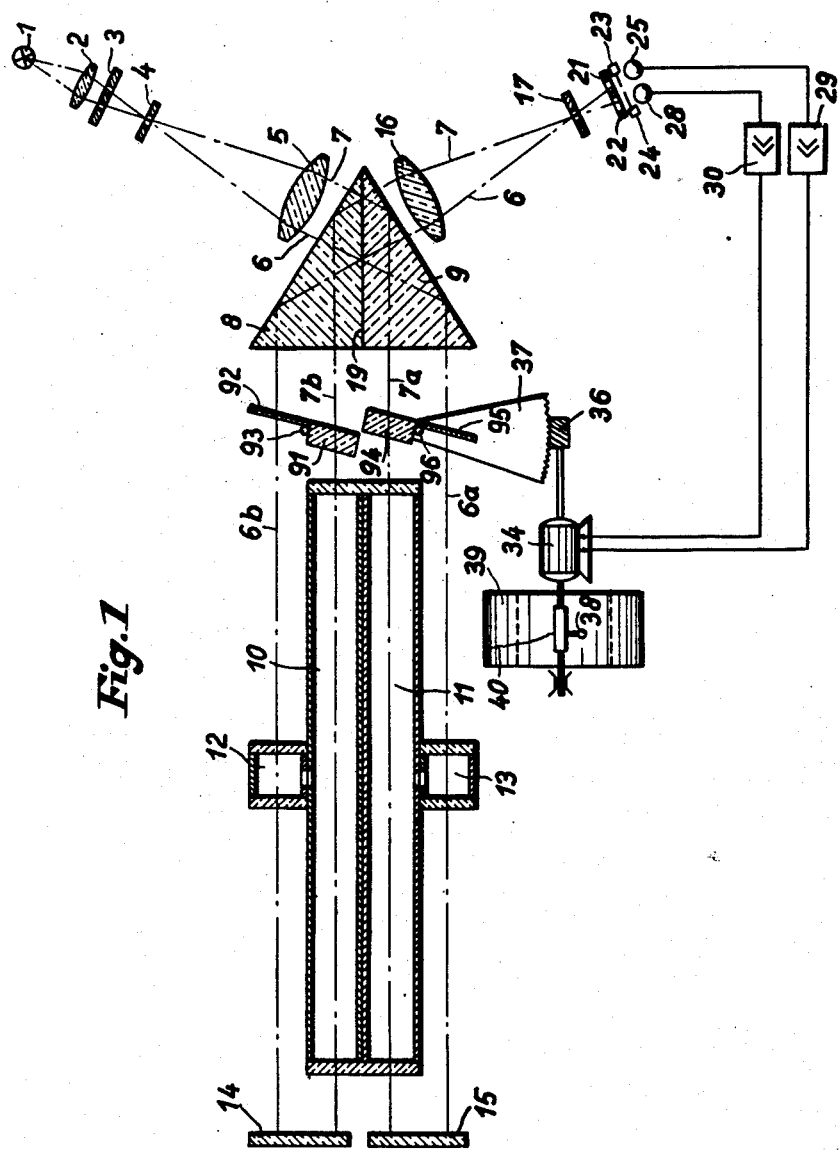

The interferometer illustrated in FIG. 1 is provided with a source of light 1, with a lens 2, a double slit 3, an apertured diaphragm 4 and another lens 5. The optical system consisting of these mentioned elements produces two parallel beams of light 6 and 7. These beams of light enter into a prism assembly of two parts 8 and 9. The meeting surface 19 between these two parts 8 and 9 consists of a semi-transparent mirror layer and causes a division or splitting of each one of the two beams of light 6 and 7 into two coherent partial light beams 6a, 6b and 7a, 7b. The partial light beams 7a and 7b enter into a pair of longitudinal measuring chambers 11 and 10 and the double slit 3 is projected by the lens 5 into the plane of the two plane mirrors 14 and 15. In the same manner the beam of light 6 is divided at the meeting surface 19 into the two partial light beams 6a and 6b of which the partial beam 6a passes through the auxiliary chamber 13 and the other partial beam 6b passes through the other auxiliary chamber 12. A further lens 16 projects the mirror faces 14 and 15 upon a double slit 21, 22, so that when the partial beams of light 6a, 6b and 7a, 7b are superimposed at the semi-transparent meeting surface and when the mirrors 14 and 15 are slightly tilted, it appears that the interference is localized at the place of these plane mirrors, so that the images of the interference appear as interference fringes in the plane of the double slot 21, 22. In the plane 17 appears an image of the apertured diaphragm which after combination of the two partial light beams at the meeting surface 19 is formed by the light beams 6 and 7. The comparison chamber 10 of the pair of measuring chambers is in communication with the auxiliary chamber 12 and the measuring chamber proper 11 is in communication with the auxiliary chamber 13. This gives the assurance that in the chambers which are in communication with each other the same pressure exists and that these chambers also contain the same substance.

The chambers 11 and 13 contain the substance to be measured, for instance a gas, while the chambers 10 and 12 contain the comparison substance, for instance a comparison gas.

In front of the chamber 10 is arranged a plane-parallel plate 91 and in front of the chamber 12 is arranged a plane-parallel plate 92. The thickness of these plates 91 and 92 is proportional to the length of the chambers 10 and 12. The plates 91 and 92 are rigidly connected with each other and are rotatable about the common axis 93. When the interferometer is to be adjusted, the plates 91 and 92 are rotatably adjusted about the axis 93.

In front of the chamber 11 is arranged a plane-parallel plate 94 and in front of the chamber 13 is arranged a plane-parallel plate 95. These two plates 94 and 95 are constructed in the same manner as the two plates 91 and 92 and they are rotatable about a comon axis 96.

In place of the illustrated compensating elements 91, 92 and 94, 95 it is also possible to employ slidably adjustable double wedges, the thickness of which corresponds to the length of the chambers. Further, one may also employ pressure compensations or other conventional compensating elements.

The FIGS. 2a and 2b illustrate each a plane view of the durable slits 21 and 22. The fringe system produced by the pair of auxiliary chambers 12, 13 is designated with 26 and the fringe system produced by the pair of measuring chambers 10, 11 is designated with 27. FIG. 2a illustrates both of these fringe systems in the zero position, whereby for the purpose of illustration the two zero lines are designated with x. FIG. 2b illustrates these two fringe systems during the measuring operation. The fringe system 27, by way of example, is displaced exactly a distance which is equal to ten widths of the fringe. A single compensating device would very likely employ for the adjustment a wrong fringe. However, the interference fringe system 26 is displaced less than one half of the width of a fringe so that for the adjusting device very simple conditions are present.

Each one of the fringe systems 26 and 27 is associated with a photoelectric adjusting device. Each of these devices consists of a double slit, an alternating light diaphragm, a photoelectric cell and a suitable amplifier. The adjusting device associated with the interference fringe system 26 is designated with 21a, 21b, 23, 25, and 29, while the adjusting device associated with the interference fringe system 27 is designated with 22a, 22b, 24, 28, and 30. FIG. 4a shows the adjusting device associated with the fringe system 26 in a side elevation view.

FIG. 3 illustrates the intensity curve 31 of the interference fringe system 26. The slits 21a and 21b of the double slit 21, which are also shown in the FIGS. 2a and 2b, are arranged at the same distance from a minimum value of the curve 31. In the zero position the left and the right hand leg of this minimum will be projected upon each one of the two slits 21a, 21b. This has the result that upon a lateral displacement of the interference fringes the greatest changes in the brightness takes place in the slits.

The light passing through the two slits 21a and 21b is alternately interrupted by means of the alternating light diaphragm 23 and reaches the photoelectric cell 25 which is connected with the amplifier 29. The amplifier 29 furnishes a voltage which is proportional to the brightness difference of the light passing through the slits 21a and 21b. The polarity of this voltage depends upon through which slit the most light passes. Accordingly, the voltage furnished by the amplifier 29 depends in its phase and amplitude upon the position of the interference fringe system and, therefore, can be used as an adjusting voltage.

In FIG. 5 the voltage furnished by the amplifier 29 is indicated with 32. It is assumed that the interference fringe system is displaced about one half of the width of the fringe. It is also assumed that the interference fringe system 27 is displaced a distance equal to ten complete widths of the fringe. The corresponding voltage furnished by the amplifier 30 is indicated in FIG. 5 with 33. The amplification of the amplifier 29 is selected to be five times as great as the amplification of the amplifier 30. The two voltages 32 and 33 are fed at the same time to the electric motor 34 so that there is produced a resultant control voltage 35. As shown in FIG. 5, as soon as with the assistance of the coarse displacement voltage 32 the interference fringe system 27 has been adjusted to a displacement less than one half of the width of the fringe, the fine adjustment is controlled by the fringe system 27.

The armature shaft of the electric motor 34 has attached thereto a worm gear 36 which engages a gear sector 37. When the electric motor 34 is energized, the plane-parallel plates 94 and 95 are rotated about the axis 96 until a complete compensation has been obtained.

The electric motor 34 is also connected with a recording stylus 38 which during the rotation of the electric motor performs a lateral displacement or a movement along the armature axis. This stylus 38 records directly a measurement curve upon a movable surface 39.

FIG. 4b illustrates another embodiment of the adjusting device in that the double slit 21 of FIG. 4a is replaced by a single slit 41 and a prism 46 adjacent thereto. The mirrors 42, 43, 45 and another prism 47 serve for recombination of the partial light beams produced by the prism 46 and to direct this recombined beam of light onto the photo cathode of the photoelectric cell 25. An alternating light diaphragm 48 interrupts the two partial light beams alternatingly.

Figure 6:
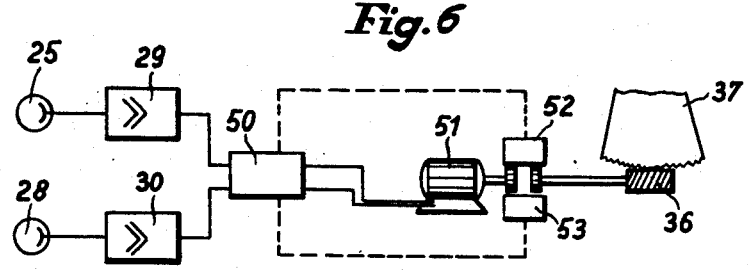
FIG. 6 illustrates still another embodiment of the photoelectric adjusting device.

The interferometer illustrated in FIG. 1 is used for a continuous measurement. If such an interferometer, however, is to be used for a discontinued measurement, then it is advisable to employ an adjusting device such as is illustrated in FIG. 6. In this FIG. 6 the voltages produced by the amplifiers 29 and 30 are fed to a relay 50. This relay feeds the voltage produced by the amplifier 29 to the electric motor 51 as soon as the coarse displacement voltage increases above a predetermined value. At the same time the relay 50 connects a gearing 52 arranged between the electric motor 51 and the worm gear 36. This gearing 52 effects a change, namely an increase, in the number of revolutions of the motor 51, so that the sector 37 is moved rather quickly about its axis of rotation. As soon as the coarse displacement voltage decreases below the adjusted value, the relay 50 connects the amplifier 30 with the electric motor 51 and at the same time disconnects the gearing 52 and connects the gearing 53. The gearing 53 causes a reduction of the number of revolutions of the electric motor 51 so that during the fine adjustment of the sector 37 the latter is rotated very slowly.

Figure 7:
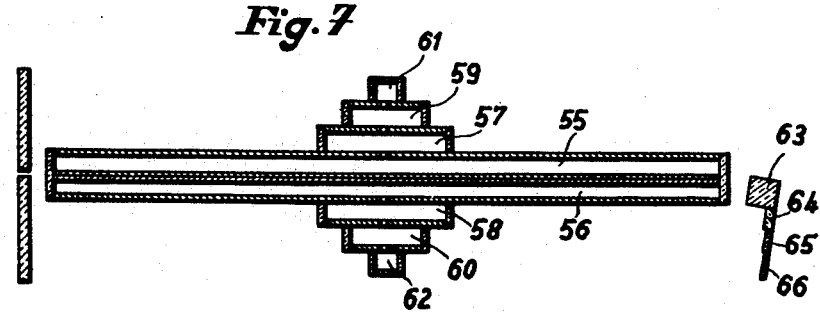
FIG. 7 illustrates an interferometer with a plurality of pairs of auxiliary chambers.

FIG. 7 illustrates an interferometer which consists of a pair of longitudinally extending measuring chambers 55, 56 and a number of pairs of auxiliary chambers 57, 58 and 59, 60 and 61, 62. The length of the auxiliary chambers is so selected that when the full measuring range of the pair of measuring chambers 55, 56 is to be used, the interference fringe system produced by the pair of auxiliary chambers 61, 62 is displaced less than one half of the width of the fringe. During the following coarse adjustment there is first adjusted the interference fringe system associated with the pair of auxiliary chambers 59, 60 and this adjustment takes place until the displacement of said fringe system amounts to less than one half of the width of the fringe. Thereupon the interference fringe system associated with the pair of auxiliary chambers 59, 60 takes over the adjustment of the interference fringe system associated with the pair of auxiliary chambers 57, 58. This fringe system effects then the fine adjustment of the interference fringe system associated with the pair of measuring chambers 55, 56. The compensating elements are formed by plane-parallel plates 63, 64, 65 and 66, the thickness of which is proportioned to the length of the chambers with which they are associated.

In this last described interferometer the measuring range may be selected very great without that the individual adjusting devices have to comply with very high requirements.

Figure 8:
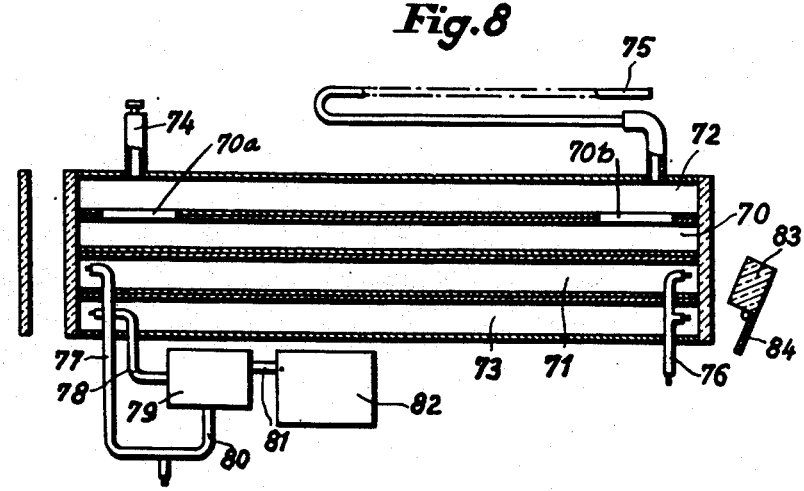
FIG. 8 illustrates an interferometer with one pair of auxiliary chambers the length of which is equal to the length of the pair of measuring chambers.

FIG. 8 illustrates another embodiment of an interferometer in accordance with the present invention. In this embodiment the pair of auxiliary chambers 72 and 73 have the same length as the pair of measuring chambers 70 and 71. The chambers 70 and 72 contain the comparison gas and are in communication with the atmosphere by means of a long pipe 75. Furthermore, the chambers 70 and 72 are in communication with each other by longitudinal slots 70a and 70b provided in adjacent walls and the chamber 72 is provided with an inlet pipe 74.

The chambers 71 and 73 contain the gas to be measured. The gas discharge is designated with 76 and has the shape of a tubular member which is connected with a suction device. The gas inlet for the measuring chamber 71 is designated with 77. A pipe 78 leads to the auxiliary chamber 73 and is connected with a mixing container 79 which in turn is connected over a pipe 80 with the gas to be measured and is also connected by means of a pipe 81 with a container 82 containing the comparison gas. When the suction device is attached to the gas discharge 76, the gas to be measured flows directly into the measuring chamber 71. Into the auxiliary chamber 73, however, enters first a mixture of gases which contains, for instance, 90% comparison gas and 10% gas to be measured. The corresponding proportion is determined and controlled by the mixing container 79.

This interferometer of FIG. 8 has also the advantage that the displacement of the fringe system associated with the pair of auxiliary chambers 72, 73 amounts to only a fraction of the displacement of the interference fringe system associated with the pair of measuring chambers 70, 71. This result is obtained by reducing the concentration of the gas to be measured in the auxiliary chamber 73. In this arrangement the compensating element may, for instance, also consist of a plate which consists of the two plane-parallel parts 83 and 84. The thickness of the two parts 83 and 84 corresponds to the proportion of the concentration of the gas to be measured in the chambers 71 and 73.

Figure 9:
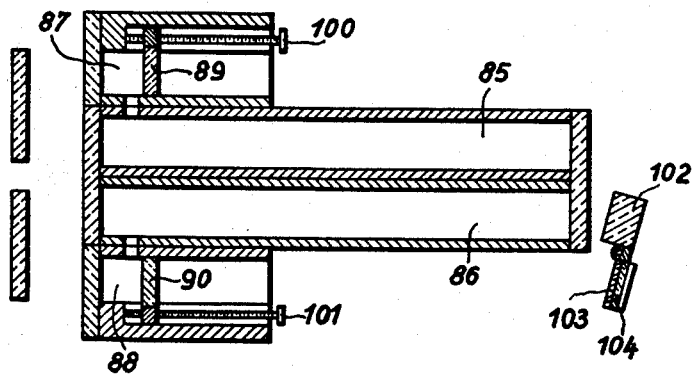
FIG. 9 illustrates an interferometer with a pair of auxiliary chambers of variable length.

FIG. 9 illustrates an interferometer which consists of a pair of longitudinally extending measuring chambers 85, 86 and a pair of auxiliary chambers 87, 88. The front glass walls 89 and 90 of the chambers 87 and 88 can be moved from the left to the right and vice versa by means of the screws 100 and 101. In this way it is possible to vary the length of the auxiliary chambers so that the interferometer can be used for different measuring conditions.

The compensating elements are formed by a plane-parallel plate 102 and a plane-parallel plate which is composed of two slidably adjustable wedges 103 and 104. These wedges can be adjusted in a direction perpendicular to the plane of the drawing in such a way that the thickness of the resulting plane-parallel plate is always proportional to the length of the chamber 90.

I claim:

1. In an interferometer of the type employing a pair of longitudinal and parallel measuring chambers, adjustable optical elements arranged in axial alignment with said chambers for effecting a compensation of the interference fringe displacement, and photoelectric means for operating said adjustable optical elements, the improvement consisting in the arrangement of at least one pair of auxiliary chambers arranged parallel to said measuring chambers, the associated interference fringe system produced by said auxiliary chambers being displaced by a smaller amount during the measurement than the fringe system produced by the measuring chambers, said auxiliary chambers being provided with compensating means which are operated by photoelectric means, and means coupling said compensating means with said adjustable optical elements of said measuring chambers.

2. In an interferometer of the type employing a pair of longitudinal and parallel measuring chambers, adjustable optical elements arranged in axial alignment with said chambers for effecting a compensation of the interference fringe displacement, and photoelectric means for operating said adjustable optical elements, the improvement consisting in the arrangement of at least one pair of auxiliary chambers arranged parallel to said measuring chambers, the length of said auxiliary chambers being shorter than the length of said measuring chambers, the associated interference fringe system produced by said auxiliary chambers, being displaced by a smaller amount during the measurement than the fringe system produced by the measuring chambers, said auxiliary chambers being provided with compensating means which are arranged in axial alignment with said auxiliary chambers and are operated by photoelectric means, and means coupling said compensating means with said adjustable optical elements of said measuring chambers, said pair of auxiliary chambers being constructed in such a manner that its associated interference fringe system produces a fringe displacement of less than one half of the width of the fringe.

3. An interferometer according to claim 1, in which the auxiliary chambers are shorter than said measuring chambers, and means for communicating each auxiliary chamber with its associated measuring chamber.

4. An interferometer according to claim 1, in which said pairs of auxiliary chambers have the same length as said pair of measuring chambers, and means for maintaining in said auxiliary chambers a smaller concentration of the substance to be measured than in said measuring chambers.

5. An interferometer according to claim 1, in which a plurality of pairs of auxiliary chambers is provided, each pair of which having a different length.

6. An interferometer according to claim 1, in which a single pair of auxiliary chambers having a variable length is provided.

7. In an interferometer of the type employing a pair of longitudinal and parallel measuring chambers, adjustable optical elements arranged in axial alignment with said chambers for effecting a compensation of the interference fringe displacement, and photoelectric means energized by the light rays passing through said interferometer for operating said adjustable optical elements, the improvement consisting in the arrangement of at least one pair of auxiliary chambers arranged adjacent and parallel to said measuring chambers, the associated interference fringe system produced by said auxiliary chambers, being displaced by a smaller amount during the measurement than the fringe system produced by the measuring chambers, said auxiliary chamber being provided with compensating means which are operated by photoelectric means, and means coupling said compensating means with said adjustable optical elements of said measuring chambers, said coupling means between the compensating means and optical elements associated with said individual pair of chambers are constructed that they become effective in accordance with the proportion of their fringe displacements.

8. An interferometer according to claim 2, in which said adjustable optical elements and said compensating means comprise pivotally mounted plane-parallel plates disposed in front of each said measuring chambers and auxiliary chambers, respectively, the thicknesses of these plates being proportional to the length of the measuring chamber and of the auxiliary chamber, respectively, the plates disposed in front of each pair of associated measuring chambers and auxiliary chambers being fixedly united, and means for rotatably adjusting each pair of fixedly united plates about a common axis.

9. An interferometer according to claim 1, including photoelectric means for adjusting said compensating means, said photoelectric means including two adjacent slits arranged the same distance away from the maximum or the minimum value of the interference figure, an alternating light diaphragm arranged to the rear of said slits, a photoelectric tube, optical elements for recombining the light beams passing through said slits upon the photo cathode of said photoelectric tube, an amplifier for the photo-current, and an electric motor fed by the amplifier current and coupled to said compensating means.

10. An interferometer according to claim 1, including photoelectric means for adjusting said compensating means, said photoelectric means including two adjacent slits arranged the same distance away from the maximum or the minimum value of the interference figure, an alternating light diaphragm arranged to the rear of said slits, a photoelectric tube, optical means for recombining the light beams passing through said slits upon the photo cathode of said photoelectric tube, an amplifier for the photo-current, an electric motor fed by the amplifier current and coupled to said compensating means, and a recorder for the measured value operated by said electric motor.

References Cited in the file of this patent

FOREIGN PATENTS

| | | |
|---|---|---|
| 465,365 | Germany | Sept. 28, 1928 |
| 793,747 | Great Britain | Apr. 23, 1958 |